Ochiltree & Johnson,
Sharpening Reciprocating Saws.

N° 47,683. Patented May 9, 1865.

Witnesses: Inventors;
S. P. Ochiltree
E. C. Johnson
per Munn & Co

UNITED STATES PATENT OFFICE.

S. P. OCHILTREE AND E. C. JOHNSON, OF MONMOUTH, ILLINOIS, ASSIGNORS TO S. P. OCHILTREE, W. S. WEIR, AND N. P. BAYMOUNT, OF SAME PLACE.

IMPROVEMENT IN SAW-FILING MACHINES.

Specification forming part of Letters Patent No. 47,683, dated May 9, 1865.

*To all whom it may concern:*

Be it known that we, S. P. OCHILTREE and E. C. JOHNSON, of Monmouth, in the county of Warren and State of Illinois, have invented a new and Improved Saw-Filing Machine; and we do hereby declare that the following is a full, clear, and exact description thereof, which will enable those skilled in the art to make and use the same, reference being had to the accompanying drawings, forming part of this specification, in which—

Figure 3:
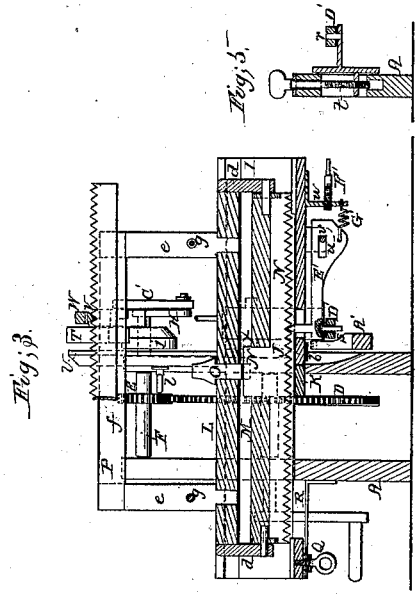
Figure 4:
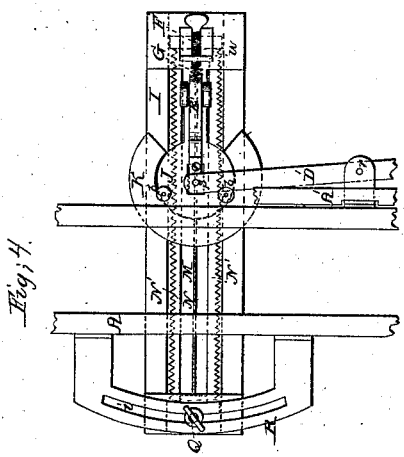
Figure 1:
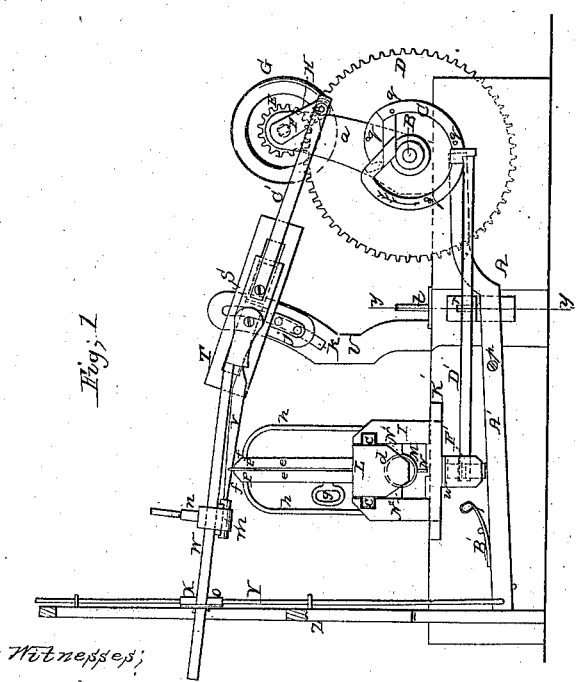
Figure 2:
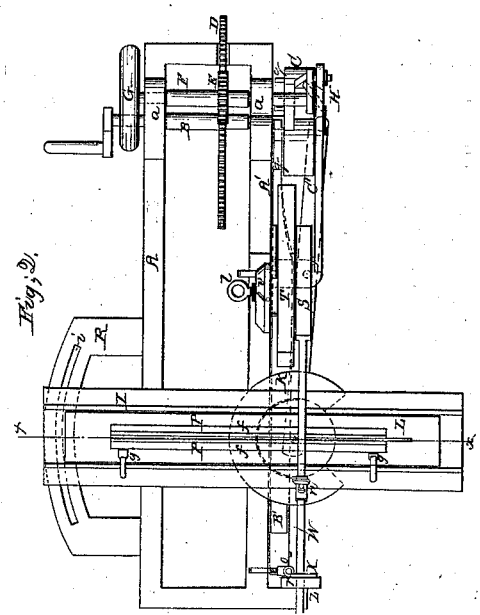

Figure 1 is a side view of our invention; Fig. 2, a plan or top view of the same; Fig. 3, a transverse vertical section of the same, taken in the line $x\,x$, Fig. 2; Fig. 4, an inverted plan of a portion of the same; Fig. 5, a vertical section of a portion of the same, taken in the line $y\,y$, Fig. 1.

Similar letters of reference indicate corresponding parts.

This invention relates to a new and improved device for filing saws, whereby the work may be done in an expeditious and perfect manner, the operation being perfectly automatic throughout, and the device being capable of filing saws with different-sized teeth, as hereinafter fully shown and described.

A represents a rectangular box or framing, on one end of which there are two standards, $a\,a$, in which the driving-shaft B of the machine is placed. This shaft B has a cam, C, at one end of it, and a spur-wheel, D, is keyed upon it between the standards $a\,a$, said spur-wheel gearing into a pinion, E, on a shaft, F, in the upper parts of the standards, the shaft F having a fly-wheel, G, at one end of it and a crank, H, at the opposite end.

I is an oblong box which is placed transversely on the box or framing A, and has a circular plate, J, at its bottom, a little at one side of its center, said plate J being fitted and working within an annular horizontal guide, K, on the box or framing A, the plate J having buttons $b\,b$ at its under side, which lap under the guide K and retain the plate J and box I in proper position, and at the same time admit of box I being adjusted on the box or framing A in different positions, as may be required in the filing of the saw.

The box I is open at the top and at both ends, and the inner surfaces of its sides near the top are grooved to receive the cleats $c\,c$ of a slide, L, which is allowed to work freely in the upper part of box I, and has a pendant, $d$, at each end of it to receive the journals of a shaft, M, which may be of square or other form, said shaft being provided with a series of longitudinal plates, $N\,N'\,N''$, which project radially from it at equal distances apart, the outer edges of said plates being provided with teeth like those of a saw, as shown in Figs. 3 and 4.

The shaft M is prevented from turning casually by means of a vertical stop, O, which is fitted in the slide L and is slotted at its lower end to fit over any one of the plates $N\,N'\,N''$ which is uppermost or over a blank plate, $N^x$, if there is no toothed plate for it to fit over in any certain desired position of shaft M. (See Fig. 3.)

On the slide L there are placed a pair of clamps, P P, between which the saw to be filed is secured. These clamps may be composed each of two uprights, $e\,e$, connected at their upper ends by a cross-piece, $f$, the saw being between the latter, which are made to grasp the saw firmly by means of screws $g$ passing through the uprights $e\,e$. The cross-pieces $f$ may also be pressed toward or in contact with the saw by means of curved rods $h\,h$, attached to the slide L, one of said rods having a certain degree of elasticity. (See Fig. 1.)

One end of the box I has a pendent set-screw, Q, which passes through a curved slot, $i$, in a horizontal plate, R, at one side of the box or framing A, said slot $i$ being a portion of a circle which is concentric with the circular plate J at the bottom of box I. (See Fig. 4.)

S is a slide which works in a guide, T, at the upper part of a standard, U, on the box or framing A. The upper part of this standard U is curved and slotted, and the guide T has a pendent projection, $j$, through which and the curved slot $k$ in standard U a set-screw, $l$, passes. This mode of attaching the guide T to the standard U admits of the former being adjusted in a more or less inclined position to suit the position required for the file V, which is attached to the slide S. The front end of the file V is fitted in a socket, $m$, secured to a bar, W, by a clamp, $n$, the rear end of said bar being secured to the slide S and the front end passing on a plate, X, one side of which is provided with a tube, $o$, the latter being fitted on a vertical rod, Y, which works in guides attached to an upright, Z, the latter being slotted vertically for the outer end of the bar W to pass through.

The lower end of the rod Y is connected to one end of a lever, A′, which has its fulcrum p at one side of the box or framing A, the opposite end of said lever being underneath pins g at the inner side of the cam C, the lever A′ being kept in contact with said pins by means of a spring, B′.

The slide S is operated from crank H by means of a connecting-rod, C′.

D′ is a lever which has its fulcrum r at the same side of the box or framing A as the lever A′. One end of the lever D′ is in contact with the cam C, the latter operating the former, and the opposite end of lever D′ is connected with a pawl or arm, E′, by means of a pendent pin, s, at the inner end of the pawl or arm, passing through the lever D′. The fulcrum of the lever D′ may be raised or lowered as required by means of a set-screw, t. (See Fig. 5.) The cam C is of such a form as to give the lever D′ two motions—to wit, a lateral vibrating one and an up-and-down motion—and these motions are communicated to the pawl or arm E′ in consequence of the latter being connected to the lever D′, as set forth.

The outer end of the pawl or arm E′ is slotted longitudinally, as shown at u, and a pin, v, passes through said slot for the pawl or arm to work on. The longitudinal sliding movement of the arm E′ is controlled by a set-screw, F′, (see Fig. 3,) and a spring, G′, is attached to the outer end of the pawl or arm and to a pendant, w, through which the set-screw passes, the spring G′ giving the return or outward movement to the pawl or arm and the adjoining end of lever D′. This pawl or arm E′ engages with the notched plates of the shaft and feeds the slide L, and consequently the saw, along underneath the file.

The teeth in the plates N N′ N″ of the shaft M are double the size of the teeth of the saw to be filed, so that the saw will be fed along the distance of two of its teeth at each movement, to enable the file to act upon every alternate tooth of the saw.

The file performs its work during its forward movement and it is raised free from the saw-teeth during its backward movement, and while the saw is being fed along by means of the lever A′ acting upon the rod, several movements may be given the file upon the teeth, the relative movements of the file and saw being arranged with a view to that end. The file, it will be seen, is made to bear upon the saw by means of the spring B′.

The plates N N′ N″ have different-sized teeth to suit the teeth of different saws, and, by adjusting the fulcrum of lever D′ through the medium of the set-screw t, the lever D′ may be adjusted so that the pawl or arm E′ will act upon different-sized teeth.

The box I is adjusted in an oblique position on the box or framing A, the set-screw Q and slot i in the plate R determining the distance of the movement in adjusting box I, the box being set first with the screw Q against one end of slot i, and when the alternate teeth are filed the box is adjusted with the screw Q against the opposite end of the slot, and the intermediate teeth filed.

Having thus described our invention, we claim as new and desire to secure by Letters Patent—

1. The shaft M, provided with one or more toothed plates N N′ N″, and attached to the under side of the slide L, to which the saw clamps are secured, in connection with the pawl or arm E′ and lever D′, the latter being operated by the cam C, or its equivalent, for the purpose of feeding the saw underneath the file, as set forth.

2. Providing the lever D′ with an adjustable fulcrum, r, and having the pawl or arm E′ slotted longitudinally with a set-screw, F′, at its rear, for the purpose of regulating the movement of the pawl or arm to suit the size of the teeth of the plates of shaft M, as described.

3. The lever A′, operated substantially as shown, with spring B′ applied to it, and connected with the rod Y, having the plate X attached for the purpose of raising the file during the backward movement of the same, and a spring keeping the file pressed down during its forward movement, as set forth.

S. P. OCHILTREE,
E. C. JOHNSON.

Witnesses:
C. A. COOCH,
JOSEPH LASTHORN.